(No Model.) 6 Sheets—Sheet 1.
P. LELARDOUX.
PRESS BOX FOR HORIZONTAL OIL PRESSES.
No. 538,687. Patented May 7, 1895.
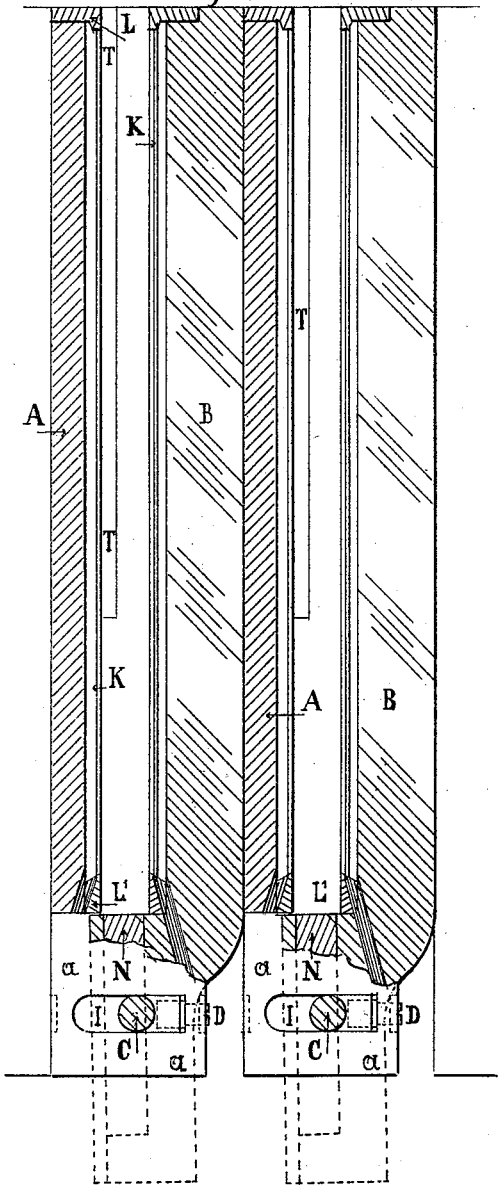
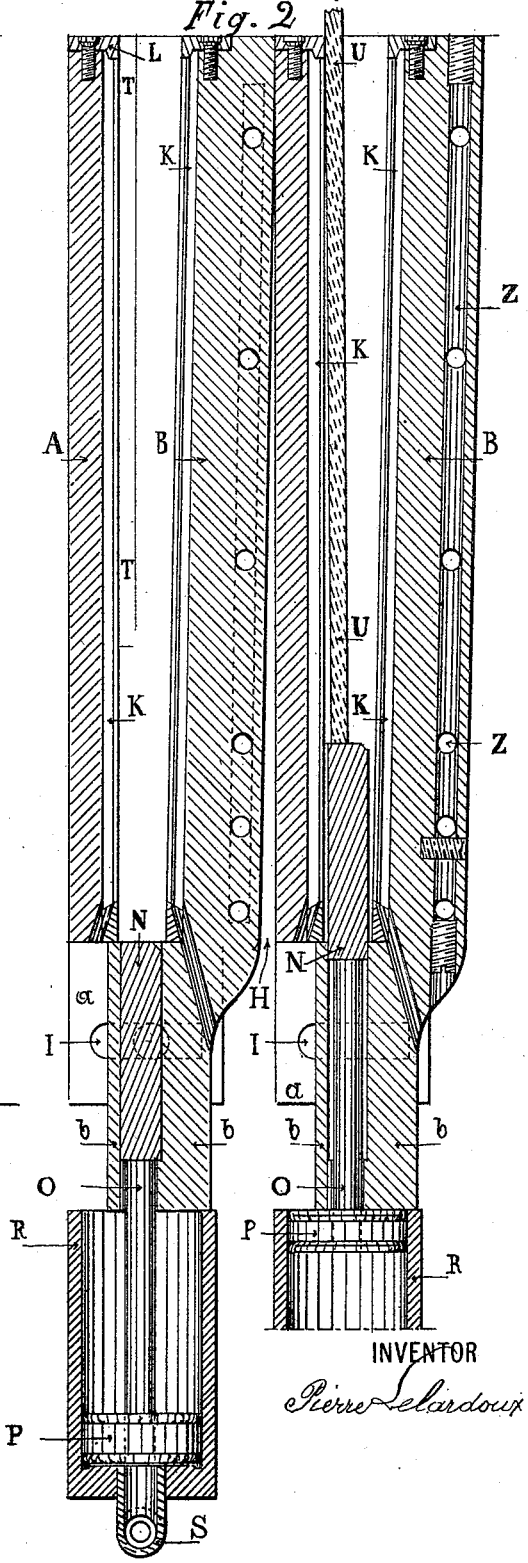
WITNESSES:
Alex. W. Acheson
A. N. Coffin
INVENTOR
Pierre Lelardoux (No Model.) 6 Sheets—Sheet 2.
P. LELARDOUX.
PRESS BOX FOR HORIZONTAL OIL PRESSES.
No. 538,687. Patented May 7, 1895.
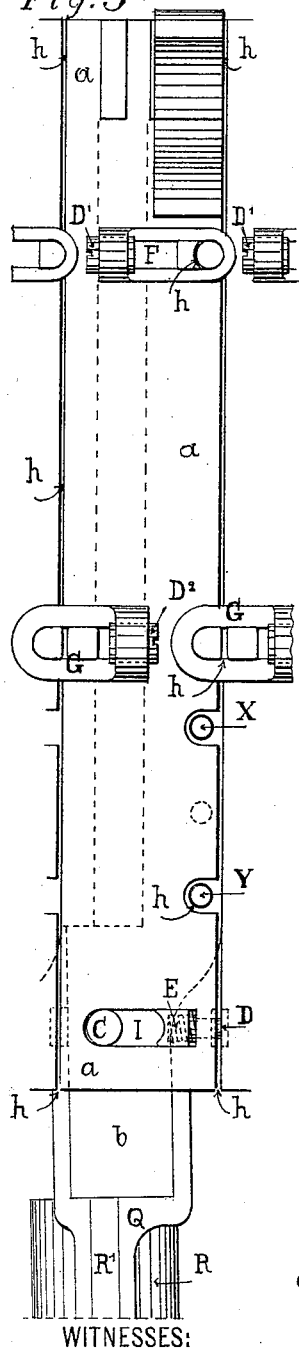
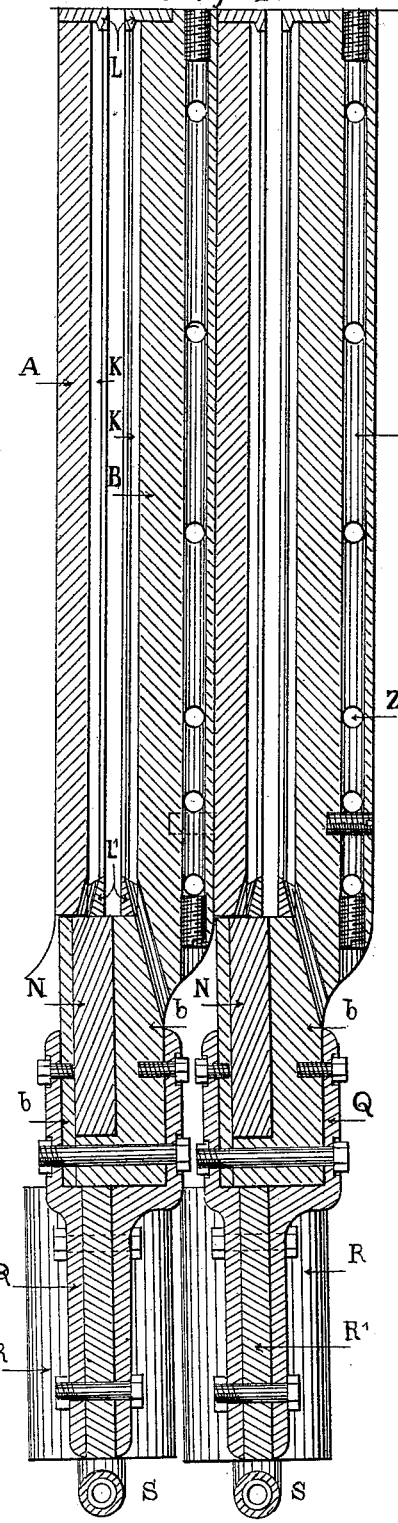
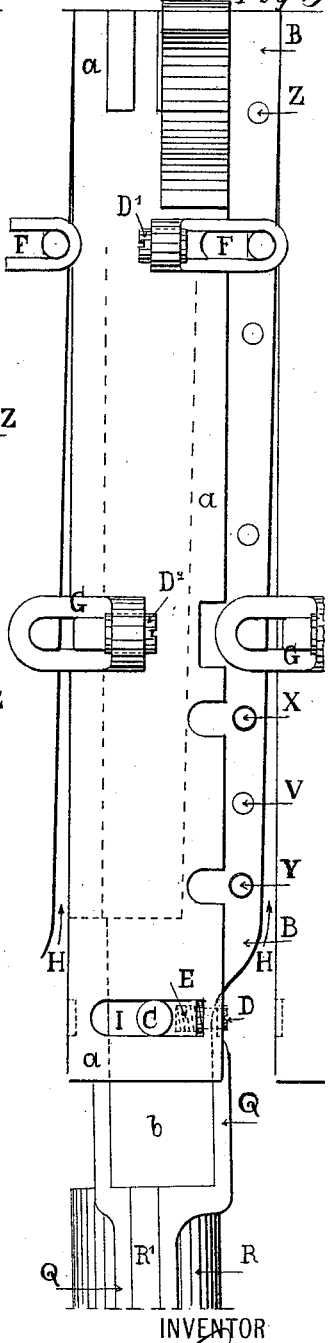
WITNESSES:
Alex. W. Acheson
A. H. Coffin
INVENTOR
Pierre Lelardoux

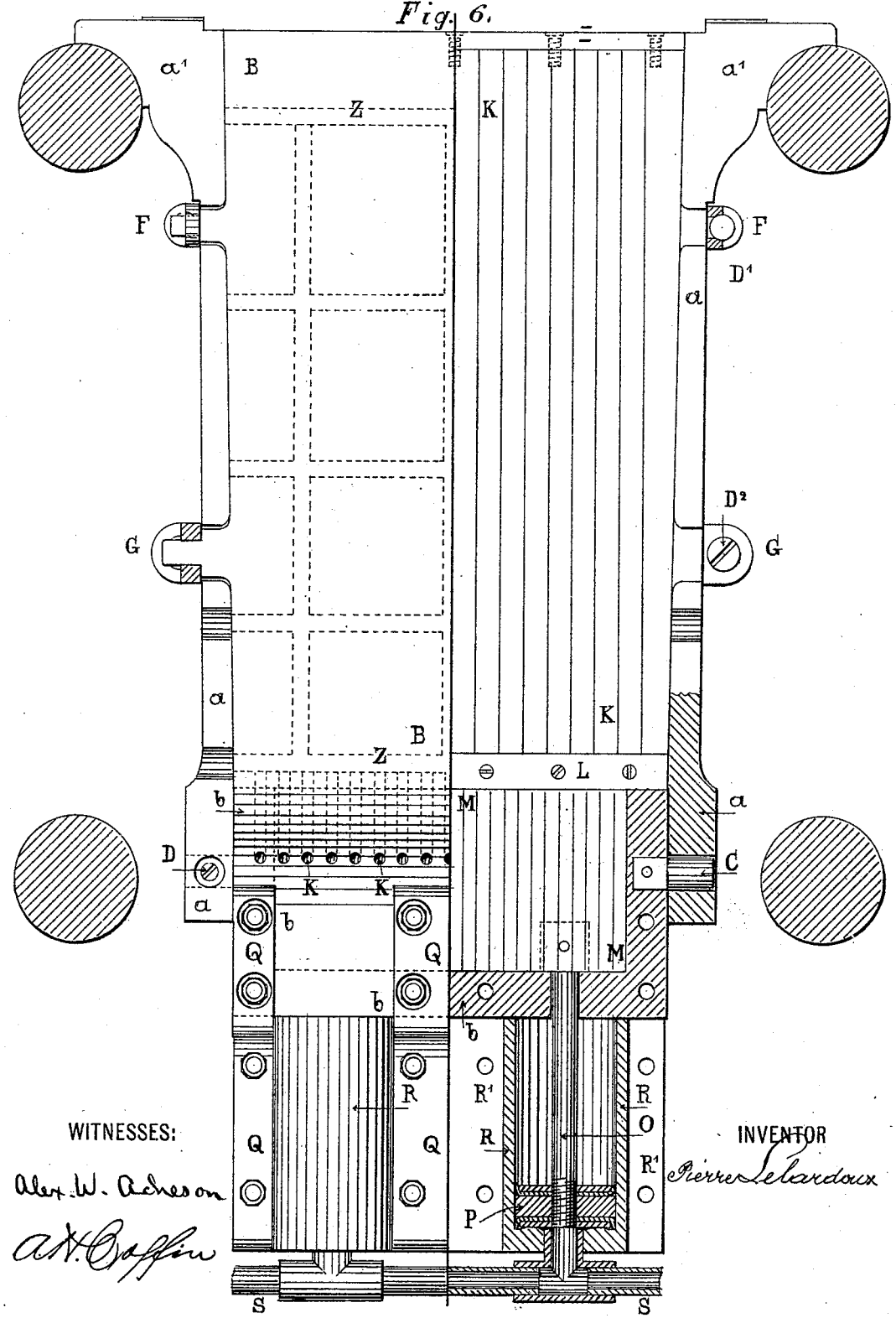

(No Model.) 6 Sheets—Sheet 4.

P. LELARDOUX.
PRESS BOX FOR HORIZONTAL OIL PRESSES.

No. 538,687. Patented May 7, 1895.

WITNESSES:
Alex. W. Acheson
A. H. Coffin

INVENTOR
Pierre Lelardoux

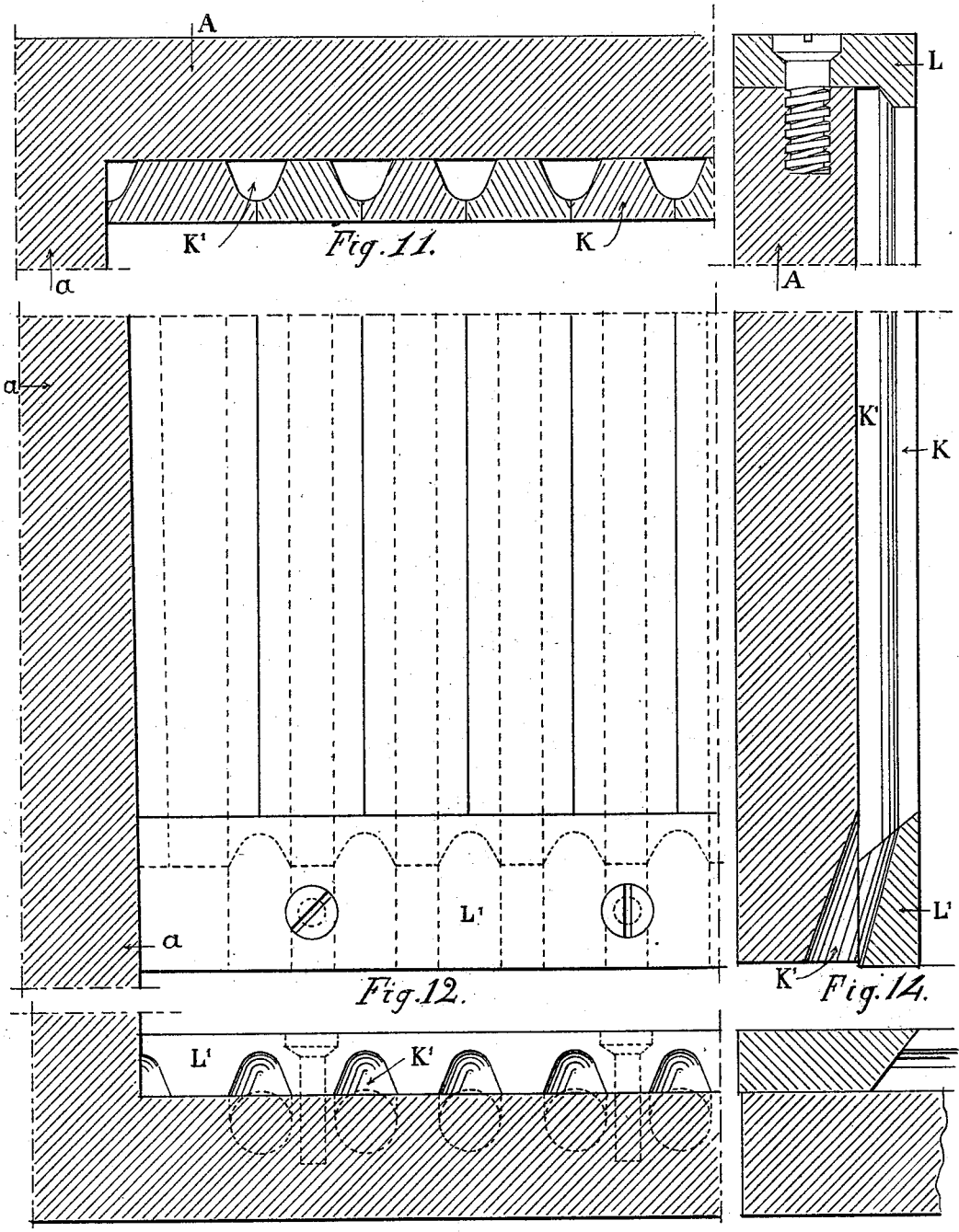

(No Model.) 6 Sheets—Sheet 6.

P. LELARDOUX.
PRESS BOX FOR HORIZONTAL OIL PRESSES.

No. 538,687. Patented May 7, 1895.

W Compressed Air Pipe
J Vacuum Pipe

WITNESSES:
Alex. W. Acheson
A. H. Coffin

INVENTOR
Pierre Lelardoux

UNITED STATES PATENT OFFICE.

PIERRE LELARDOUX, OF DENISON, TEXAS.

PRESS-BOX FOR HORIZONTAL OIL-PRESSES.

SPECIFICATION forming part of Letters Patent No. 538,687, dated May 7, 1895.

Application filed November 13, 1894. Serial No. 528,656. (No model.)

*To all whom it may concern:*

Be it known that I, PIERRE LELARDOUX, a citizen of the United States, residing at Denison, in the county of Grayson and State of Texas, have invented a new and useful Press-Box for Horizontal Oil-Presses, of which the following is a specification.

My invention relates to the kind of press-boxes that are now used in horizontal oil presses; and the objects of my improvements are, first, to produce a cake of even thickness and density, and without strain on any part of the box; second, to provide a box fitted with a strainer that will be more lasting, which can be cleaned without removing it from the box, or the box from the press, and to which the cake will not adhere; third, to provide a box fitted with effective and economical means of raising the cake out of the box after it is pressed; fourth, to improve the system of heating the box.

All the devices together constitute a complete box; and each of them is necessary to its proper working. This new box is constructed of metal in all its parts. Steel, bronze or aluminum can be used, the same as in former boxes.

I attain the objects of my invention by the mechanism illustrated in the accompanying drawings, of which the following is a brief description.

Figure 7:
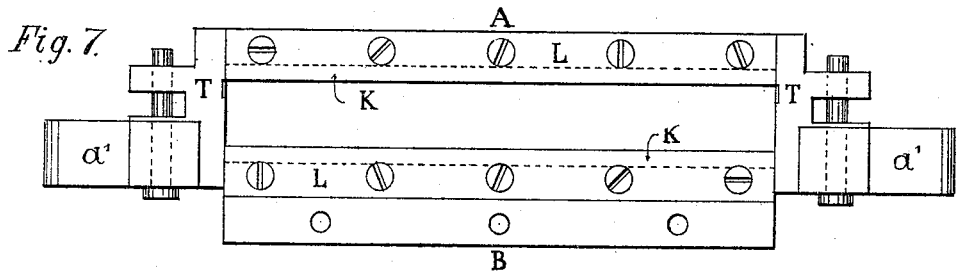
Figure 8:
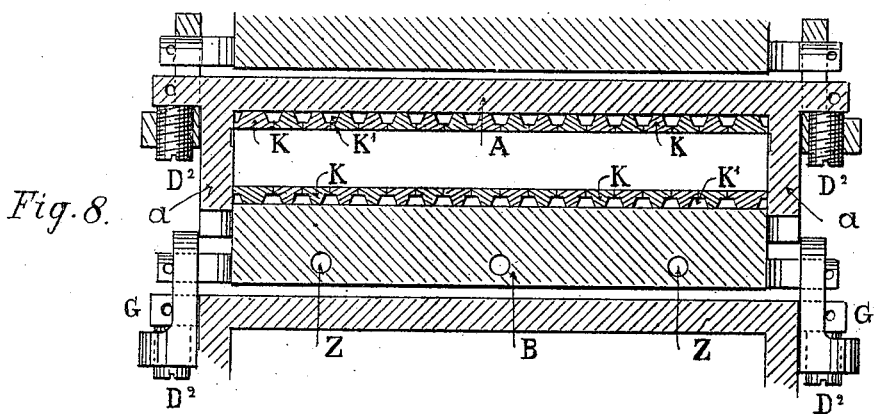
Figure 9:
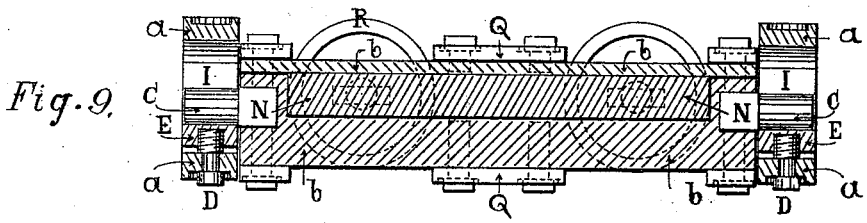
Figure 10:
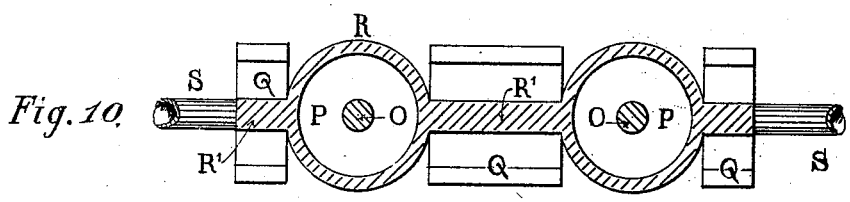
Figure 15:
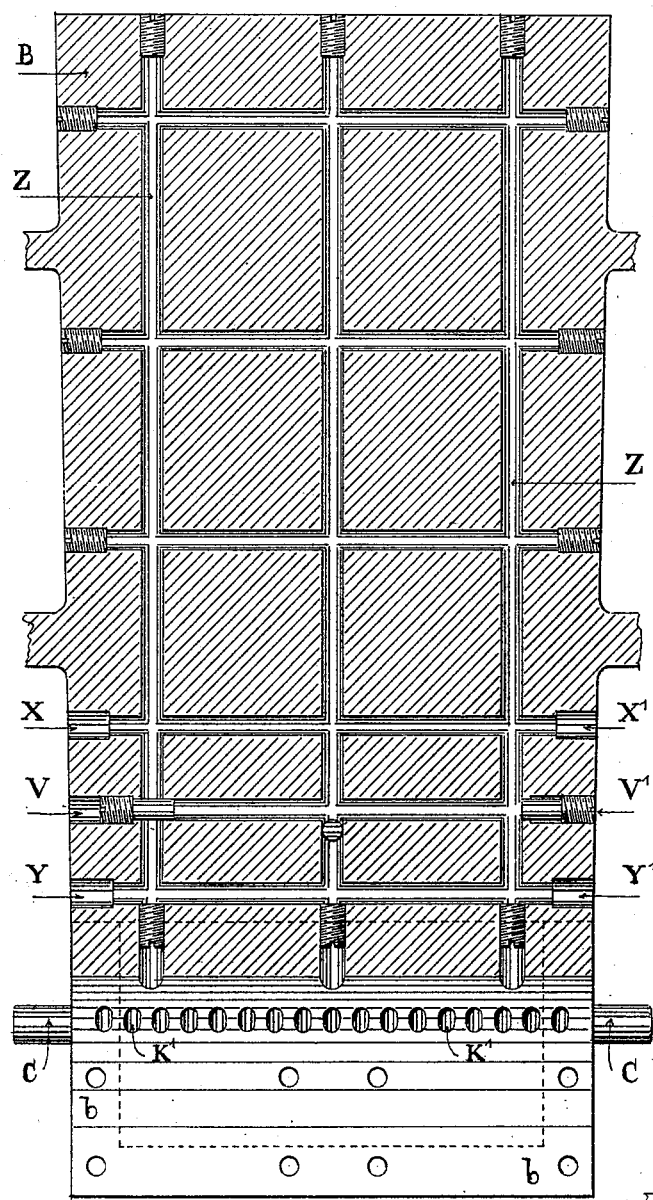
Figure 16:
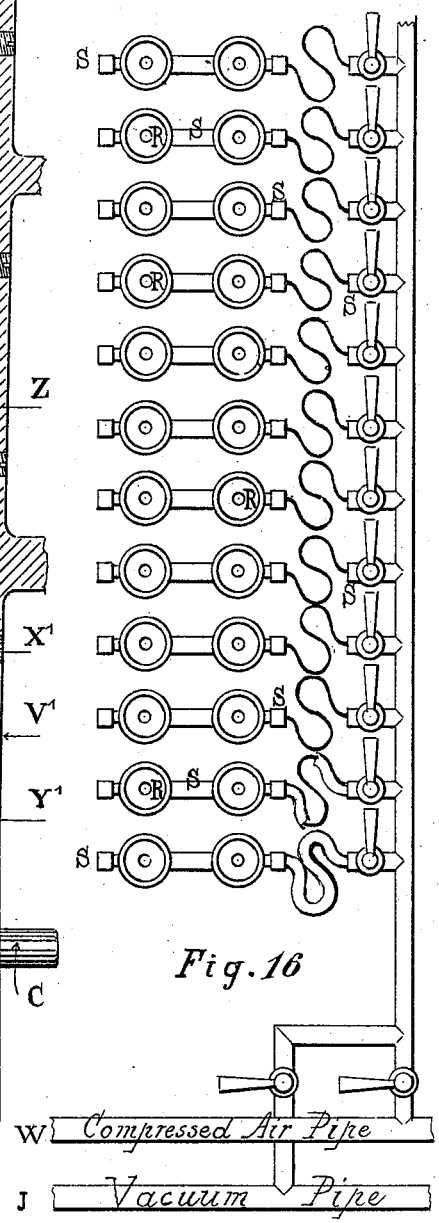

Figure 1 is a vertical section of the box when the pressure has just been applied. Fig. 2 is a vertical section of the box when opened. Fig. 3 is a side view of the box when closed, as in Fig. 4. Fig. 4 is a vertical section of two boxes when closed. Fig. 5 is a side view of the box when opened, as in Fig. 2. Fig. 6, left-hand side, is an outside view of half of the front B of the box. Fig. 6, right-hand side, is a vertical longitudinal section on half of the box. Fig. 7 is a horizontal view of the top of the box when opened. Fig. 8 is a horizontal section of the box opened. Fig. 9 is a horizontal section through pivot C. Fig. 10 is a horizontal section through cylinders. Fig. 11 is a detail horizontal section of strainer. Fig. 12 is a detail front view of strainer. Fig. 13 is a detail top view of lower plate to strainer. Fig. 14 is a vertical section of strainer. Fig. 15 is a vertical longitudinal section through front part B of box. Fig. 16 is a plan showing the disposition and connections of the compressed-air system used for raising the cake.

In the accompanying drawings the same reference-letters indicate the same parts.

The new box is composed of two separate parts pivoted together.

A, is the back of the box. It forms the sides, $a, a$, which are cast solid with it. These sides project downward, past the back plate, A, of the box, (Figs. 1, 2, 3, 5, &c.).

B, is the front of the box. It extends downward, $b, b$, to form the bottom of the box.

C, are the pivots which unite the two parts, A and B, together. They are made fast to the part, B, and work in the slots, I, provided in the downward extension of the sides, $a, a$. The travel of the pivots in the slots is regulated by the set-screws, D, which operate the sliding blocks, E, placed in front of the pivots and limiting their movement forward. The upper adjustable links, F, determine the size of the opening at the top of the box. They are adjusted by the set-screws, D', (Figs. 3 and 5.) The sliding blocks, E, and adjustable links, F, regulate the width and pitch of the opening between the two faces of the box. The lower adjustable links, G, regulated by the set-screws, $D^2$, tie the front, B, of each box to the back, A, of the preceding box and are used for pulling the boxes open. They are so adjusted that, when the boxes are pulled back open by the press, the top edge of B just touches the back, A, of the next box in front without preventing the full opening of the box. When all the boxes of the series are opened, the front of each box touches the back of the next one at the top, but a triangular space, H, is left between the boxes from the bottom up. That space represents and is the counter part of the pitch of the interior opening of the box; and when the space, H, is closed, the two inside faces of the box are parallel up and down. They are always so sidewise.

In order to prevent the projections for links, on the front, B, and the pivots, C, from coming to a bearing, under pressure against the sides, $a, a$, of the box, the cake should be formed thick enough to allow margins, $h, h$, between these parts, Fig. 3.

Slots I, Figs. 2, 3 and 5, are provided in the downward projections of the sides, a, a, of the box for the pivots, C, to travel in, as already mentioned above.

The inside face of each part, A and B, of the box is provided with a strainer composed of metal bars, K, set vertically and maintained in position by plates, L and L', which are fastened to the faces of the box. This is shown in the different sections, and more particularly in Figs. 11, 12, 13, and 14, where the strainer is represented in details. The bars fit closely together and with the plates forming capillary joints through which the oil will filter without the meal being allowed to pass. The bars are channeled out on the back to form drainage channels, K', and to reduce the thickness of the metal at the joints in order to give a shorter transit to the oil, leaving just enough metal to withstand the pressure. The joints are also slightly open on the back to give a free escape to the ooze and matter, if any, and prevent clogging. The lower plate, L', is beveled back on the top and channeled out for drainage and to correspond with the channels, K'.

The back, A, of the box is channeled out, and the front, B, bored out, as shown, to correspond with and form outlets for the channels, K', of the strainer.

In the downward extensions, b, b, of the front, B, of the box a chamber, M, is provided, as shown, Figs. 1, 2 and 6, and where slides the lift block, N, with a perfect fit at the top to prevent any meal from getting into the chamber, M. The bottom of this chamber has openings for the passage of the piston rods, O, which are attached to the lift block (cake lifter), N, and to the pistons, P, so that the lift block is moved up and down by the pistons. The straps, Q, hold the cylinders, R, firmly to the bottom, b, b, of the box by being bolted to it and to the flanges, R', which are cast solid with the cylinders. The cylinders are opened at the top, and the pistons are worked by air pressure alternately applied under and above the pistons, by connecting the cylinder space below each piston, through the connections, S, with a compressed air pipe, W, to raise the piston and with a vacuum pipe, J, (Figs. 2, 6, and 16,) to bring the pistons down, the pistons to have air-pump packing both ways.

The two sides, a, a, of the box have grooves, T, inside of the opening and where the cake, U, is finally formed. These grooves extend about half way down, and are one-eighth of an inch deep at the top, tapering to nothing. The object of these grooves is to keep the cake against the back, A, when the box opens, and have it plumb with the lift block. The lift block has its upper front angle beveled off to allow the cake to form a projection there, which will catch when the box opens, and, so, detach the cake from the back, at the lower part and bring it more central with the lift block, N.

The heating of the improved box is done by steam as before. (It might also be done by hot compressed air, and there would be no trouble from leakage.) The circulation through the plate, B, is improved, however, by the adoption of movable plugs, V and V', as shown in Fig. 15, where passage V is closed and V' opened, thus forcing the heating agent to pass from the inlet, X, through the heating channels, Z, and the passage, V', before reaching the outlet, Y. All the channel-plugs are screw plugs, to be easily removed for cleaning. Steam connections can be made, also, on the right side of the box, X', Y'; the passage on that side, V', being closed and the opposite one, V, opened.

Having thus described the different parts of my invention, I will now explain its working and improvements.

In horizontal oil presses, (more particularly the Diffey press) the boxes stand upright and are filled with meal from the top. The meal is, by gravity, packed closer at the bottom of the box than at the top. The boxes now in use have rigidly parallel faces, with bottoms that slide solid into each other. They produce a cake of uneven density, harder at the bottom and looser at the top. Further, the resistance to pressure being unequal, the boxes close more at the top. This causes a strain on the bottom of the boxes, by leverage, and gives considerable trouble: bending and loosening bolts, &c. These defects are avoided in my improved box. In the improved box, the opening is so regulated and set, that the greater volume of meal at the top compensates the greater density of the meal at the bottom; and the box works as follows: When all the boxes in the series are filled and the pressure is applied, the first action produced is the pivoting of the front part, B, of each box around C, and the closing of the triangular space, H, between the boxes. This movement brings the two faces of each box parallel, and compresses the top meal to the density of the bottom meal: since, the difference in the opening has been made proportional to the difference of density in the meal. So far, no pressure has been exerced against the meal or against any part of the box: except what was necessary to bring each box parallel with itself, and all the boxes parallel with each other, as represented by Fig. 1. From now on, the resistance of the meal being equal everywhere, the two parts of the box will keep parallel: the pivots, C, sliding in the slots, I, without friction. The boxes will also keep parallel with each other. The pressure will be exerced in a square thrust against the meal only, and without strain on any part of the box; and the cake produced will be of an equal thickness, and of an even density throughout.

The improved boxes are closed at the top by lid and cam, as the boxes now in use.

The improved boxes are opened by the press pulling on the lower links, G, as practiced now.

In the boxes now in use for horizontal oil presses, the mat cloths have to be renewed often, and the backing plates are hard to clean; and for these operations the boxes have to be removed from the press. My improved box is free from these inconveniences and costly manipulations.

The strainers composed of metal bars, as hereinbefore described are easily fitted each one to its respective place, and are practically indestructible. They take the place of the mats and cloths now commonly used, and occupy about the same space in the box.

The cleaning of the drainage channels, K', from ooze and matter, if any, can be done by removing the upper plate, L, and passing a rod out through the channels without taking the strainer out of the box, or the box out from the press; and even without stopping the press, by cleaning one box at a time, and putting in a block to keep it open. The cleaning rod should have its lower end made of hinged parts to bend through the channels' outlets. If the channels are so obstructed that the rod cannot go through then the bars of the strainer can be taken out separately and the rod forced through the outlets. The surface of the strainer must be kept smooth to prevent the sticking of the cake; and also the surface of the channels to facilitate drainage and cleaning.

With the boxes now in use, the removal of the cake is a difficult and lengthy operation on account of the sticking of the cake to the mat cloth, and of the bad working of the levers which have to be operated one at a time. In my improved box the cake does not adhere to the strainer, and the cakes of all the boxes in the series are raised at once, by the turning of a handle.

The description of the cylinders and pistons used for moving the lift block, N, (cake lifter) has been made hereinbefore, and the accompanying drawings give a clear idea of their form and arrangement.

The lift block, N, could be moved directly by compressed air, by making the chamber, M, air-tight; but the cylinders and pistons seem preferable for the following among other reasons: First, they are better adapted to withstand the pressure than the flat sides of the chamber; second, it would be difficult to make the chamber, M, air-tight; third, the cylinders being detachable, are easier of adjustment and repairs.

Compressed air is used in preference to steam or water on account of possible leakage, which would injure the oil; and also as being more convenient. The compressed air is admitted under the piston through proper connections and pipes. Separate flexible pipes connect each set of cylinders (the cylinder or cylinders of one box) with the supply pipe for the press to permit the backward and forward movement of the boxes in the press. Such connections are made on either side of the box, as per Figs. 6, 10 and 16, the opposite side being closed. Each connection is fitted with a cock to control the supply of compressed air to such box, and close it when the box is being cleaned or removed.

The supply pipe of each press is connected directly or indirectly with the reservoir, (tank or set of tanks or cylinders) of compressed air of sufficient capacity to work all the presses connected with it; and where the air is kept at a proper and convenient pressure by ordinary air compressing machinery. The supply pipe of each press is also connected with a vacuum tank (or set of tanks or cylinders) of sufficient capacity where a vacuum is maintained by proper and ordinary machinery. The object of this last connection is to reduce the pressure of the air under the pistons to a point below that of the atmosphere; so that the pistons will be forcibly driven down by the excess of pressure of the atmosphere over that of the vacuum tank, which excess may be brought to ten to twelve pounds per square inch. The lift block being fastened to the piston, will follow it. The connection between the supply pipe of each press with the compressed air tank and vacuum tank is governed by one or more cocks of proper pattern, Fig. 16.

When the cakes are pressed and the boxes pulled back open, the compressed air is admitted to raise the pistons and lift blocks. When they are raised, the supply is closed. The pistons remain up until connection is made with the vacuum tank, when they come down to their proper place with the force of the pressure of the atmosphere over that of the vacuum tank. If the vacuum tank was too small, it would be necessary to connect with the atmosphere first; and an extra cock would have to be provided.

The improvements in the circulation of steam through the plate, B, of the improved box by the adoption of the movable plugs shown in Fig. 15 have been fully set forth and described before; and no further explanations are necessary.

Having thus described my invention and explained its working, what I claim as new, and desire to secure by Letters Patent, is as follows:

1. In a horizontal oil press, a press box having its own independent action in the series and composed of two separate parts, A and B, part B having pivot pins, C, at its lower end, and part A having its sides, a, a, horizontally slotted to receive said pins and the adjustable blocks, E, in combination with means connecting said parts, A and B, near their upper ends and permitting a limited relative movement thereof, substantially as described and for the purposes set forth.

2. In a horizontal oil press, a press box having its own independent action in the series and composed of two separate parts, A and B, connected at their lower and near their upper ends by means permitting limited relative movements of said parts, the said box being fitted with the strainer bars, K, and provided near the bottom of each face with open outlets corresponding with the vertical drainage channels, K', of the strainer, substantially as described and for the purposes set forth.

3. In a horizontal oil press, a press box having its own independent action in the series and composed of two separate parts, A and B, connected at their lower and near their upper ends by means permitting limited relative movements of said parts, and having the front part, B, extended downwardly to form the bottom of the box, substantially as described and for the purposes set forth.

4. In a horizontal oil press, the combination with a press box having its own independent action in the series and composed of two separate parts, A and B, connected at their lower and near their upper ends by means permitting limited relative movements of said parts, of a strainer composed of separate loose metal bars, K, set vertically on each inside face A and B, of the box, fitted together with close capillary joints and held in place top and bottom by plates, L, L', removably secured to the face of the box, substantially as described and for the purposes set forth.

5. In a horizontal oil press, the combination with a press box having its own independent action in the series and composed of two separate parts A and B, connected at their lower and near their upper ends by means permitting limited relative movements of said parts, of a strainer composed of separate loose metal bars, K, set vertically on each inside face A and B, of the box, said bars presenting a straight, smooth surface in front and being vertically channeled out on the back, K', for drainage and cleaning and of the lower plate, L', beveled back on the top and channeled out to correspond with the channels K', substantially as described and for the purposes set forth.

6. In a horizontal oil press, the combination with a press box having its own independent action in the series and composed of two separate parts A and B, connected at their lower and near their upper ends by means permitting limited relative movements of said parts and having the front part B, extended downwardly and fitted with lift block, N, moving up and down in chamber, M, of the cylinders, R, and pistons P as means for operating the lift block, N, the pistons being actuated by air pressure applied alternately under and above the pistons, substantially as described and for the purposes set forth.

7. In a horizontal oil press, the combination with a press box having its own independent action in the series and composed of two separate parts, A and B, connected at their lower and near their upper ends by means permitting limited relative movements of said parts and having the part, B, provided with inside channels, Z, for the purpose of heating said part, the inlet, X, and outlet, Y, for the heating agent, steam or hot air, being on the same side of the box, of the movable plugs, V and V', adapted to be inserted at certain points in the channels, Z, for the purposes described.

Denison, Texas, November 8, 1894.

PIERRE LELARDOUX.

Witnesses:
ALEX. W. ACHESON,
A. H. COFFIN.